US012738291B2

(12) United States Patent
Yamanashi et al.

(10) Patent No.: US 12,738,291 B2
(45) Date of Patent: Sep. 15, 2026

(54) AUDIO PROCESSING APPARATUS, AUDIO PROCESSING METHOD, AND RECORDING MEDIUM

(71) Applicant: Panasonic Automotive Systems Co., Ltd., Kanagawa (JP)

(72) Inventors: Tomofumi Yamanashi, Kanagawa (JP); Naoya Mochiki, Kanagawa (JP); Yutaka Banba, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 147 days.

(21) Appl. No.: 18/651,162

(22) Filed: Apr. 30, 2024

(65) Prior Publication Data

US 2024/0282325 A1 Aug. 22, 2024

Related U.S. Application Data

(63) Continuation of application No. PCT/JP2022/037014, filed on Oct. 3, 2022.

(30) Foreign Application Priority Data

Feb. 3, 2022 (JP) ................................ 2022-015324

(51) Int. Cl.
*G10L 19/00* (2013.01)
*G10L 21/00* (2013.01)
(Continued)

(52) U.S. Cl.
CPC ...... *G10L 21/0224* (2013.01); *G10L 21/0264* (2013.01)

(58) Field of Classification Search
None
See application file for complete search history.

(56) References Cited

U.S. PATENT DOCUMENTS 5,949,888 A * 9/1999 Gupta ...................... H04B 3/23 379/406.01
8,634,569 B2 * 1/2014 Lu ........................ H04M 9/082 381/66

(Continued)

FOREIGN PATENT DOCUMENTS

CN 108076239 A * 5/2018 ......... G10L 21/0208
CN 109346098 A * 2/2019 ......... G10L 21/0208

(Continued)

OTHER PUBLICATIONS

English Translation of International Search Report dated Dec. 6, 2022, for the corresponding International Patent Application No. PCT/JP2022/037014, 2 pages.

*Primary Examiner* — Shreyans A Patel
(74) *Attorney, Agent, or Firm* — Seed Intellectual Property Law Group LLP

(57) ABSTRACT

An audio processing apparatus includes a processor coupled to a memory. The processor receives an audio signal from a microphone serving to collect sound in a space. The processor determines whether a level of a reference signal is equal to or greater than a threshold. The reference signal is a reproduction signal reproduced by a speaker serving to output audio sound to the space. The processor outputs, as an output signal to a speech recognition device, a removal signal obtained by removing an audio component of the reference signal from the audio signal. The processor outputs, as an output signal to the speech recognition device, a replacement signal in place of the removal signal in response to determining that the level of the reference signal is equal to or greater than the threshold. The replacement signal is at least one of comfort noise and a mute signal.

15 Claims, 3 Drawing Sheets

(51) Int. Cl.

| | |
|---|---|
| ***G10L 21/0224*** | (2013.01) |
| ***G10L 21/0264*** | (2013.01) |
| ***G10L 25/00*** | (2013.01) |

(56) References Cited

U.S. PATENT DOCUMENTS

| | | | | |
|---|---|---|---|---|
| 9,185,506 | B1 * | 11/2015 | Deng | G10K 11/175 |
| 9,792,902 | B2 | 10/2017 | Miyasaka et al. | |
| 10,262,653 | B2 | 4/2019 | Miyasaka et al. | |
| 11,183,189 | B2 * | 11/2021 | Taki | G10L 15/26 |
| 2013/0179168 | A1 | 7/2013 | Bae et al. | |
| 2015/0213802 | A1 | 7/2015 | Bae et al. | |
| 2015/0349841 | A1 * | 12/2015 | Mani | H04M 3/002<br>379/406.08 |
| 2017/0069323 | A1 | 3/2017 | Bae et al. | |
| 2017/0092281 | A1 * | 3/2017 | Zargar | G10L 19/012 |
| 2018/0025728 | A1 | 1/2018 | Bae et al. | |
| 2020/0005790 | A1 | 1/2020 | Bae et al. | |
| 2020/0205269 | A1 * | 6/2020 | Hanazono | H05B 47/10 |
| 2021/0158821 | A1 | 5/2021 | Bae et al. | |
| 2021/0201894 | A1 | 7/2021 | Geng | |
| 2022/0189450 | A1 | 6/2022 | Yamanashi et al. | |
| 2024/0282325 | A1 * | 8/2024 | Yamanashi | G10L 15/28 |

FOREIGN PATENT DOCUMENTS

| | | | | | |
|---|---|---|---|---|---|
| CN | 113241085 | A * | 8/2021 | G10L 25/51 |
| JP | 2009181025 | A | 8/2009 | |
| JP | 2013142903 | A | 7/2013 | |
| JP | 6225920 | B2 | 11/2017 | |
| JP | 2019176431 | A | 10/2019 | |
| JP | 2021057807 | A | 4/2021 | |
| JP | 2021096482 | A | 6/2021 | |
| WO | WO-2011148624 | A1 * | 12/2011 | H03G 11/002 |

* cited by examiner

AUDIO PROCESSING APPARATUS, AUDIO PROCESSING METHOD, AND RECORDING MEDIUM

CROSS-REFERENCE TO RELATED APPLICATIONS

This application is a continuation of International Application No. PCT/JP2022/037014, filed on Oct. 3, 2022 which claims the benefit of priority of the prior Japanese Patent Application No. 2022-015324, filed on Feb. 3, 2022, the entire contents of which are incorporated herein by reference.

FIELD

Embodiments described herein relate generally to an audio processing apparatus, an audio processing method, and a recording medium.

BACKGROUND

There is a known audio processing system that processes a speech recognition command on the basis of speech uttered by a speaking person.

For example, a patent literature JP 6225920 B2 discloses a configuration including a first speech recognition unit that recognizes sound collected by a microphone, and a second speech recognition unit that recognizes audio sound output by a speaker. When the audio sound recognized by the second speech recognition unit includes a speech recognition command, recognition by the first speech recognition unit is stopped.

However, in such a conventional technique, when the sound collected by a microphone includes a noise component such as a residual echo component that cannot be removed by an echo canceller, misrecognition of speech may occur.

Accordingly, in the conventional technique, it may be difficult to suppress misrecognition of speech.

SUMMARY

An audio processing apparatus according to an embodiment of the present disclosure includes a memory in which a computer program is stored and a hardware processor coupled to the memory. The hardware processor is configured to perform processing by executing the computer program. The processing includes receiving an audio signal from a microphone serving to collect sound in a space. The processing includes determining whether a level of a reference signal is equal to or greater than a threshold. The reference signal is a reproduction signal reproduced by a speaker serving to output audio sound to the space. The processing includes outputting, as an output signal to a speech recognition device, a removal signal obtained by removing an audio component of the reference signal from the audio signal. The processing includes outputting, as an output signal to the speech recognition device, a replacement signal in place of the removal signal in response to determining that the level of the reference signal is equal to or greater than the threshold. The replacement signal is at least one of comfort noise and a mute signal.

DETAILED DESCRIPTION

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

Figure 1:
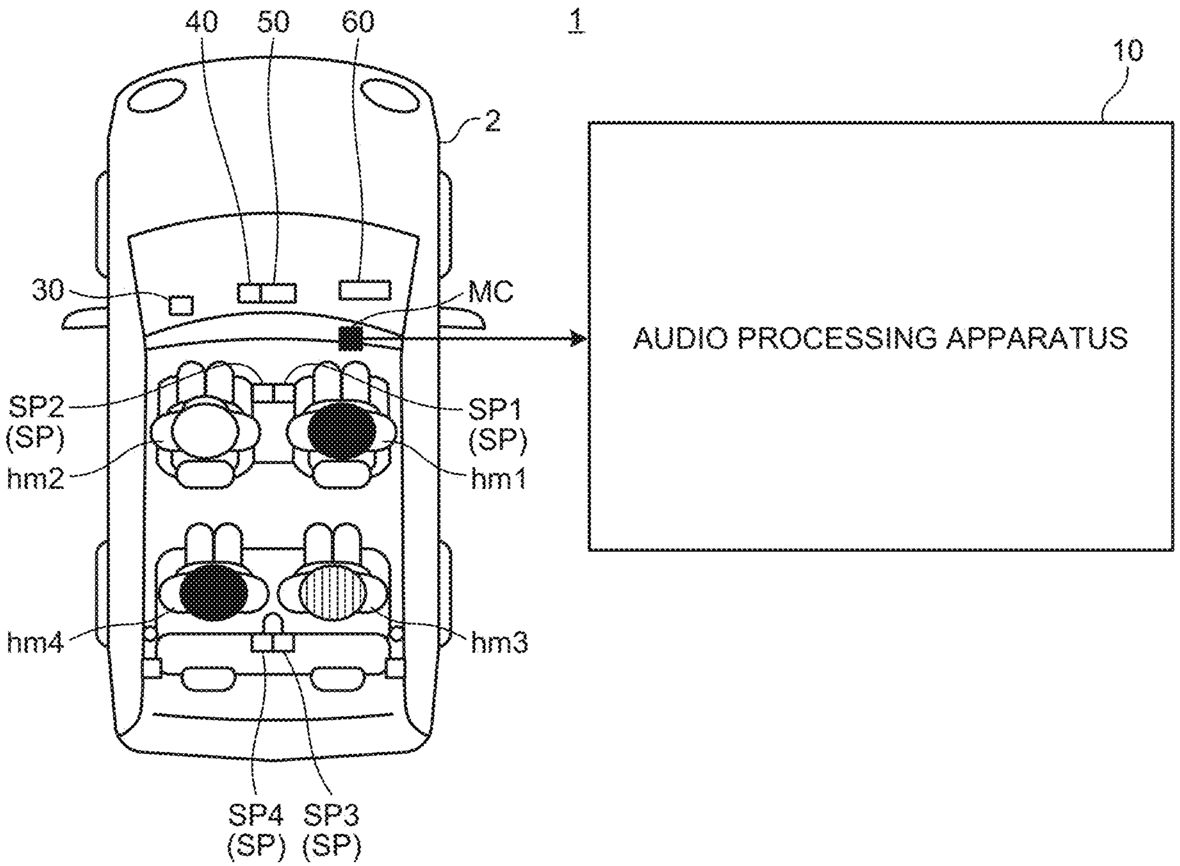
FIG. 1 is a diagram illustrating an example of a schematic configuration of an audio processing system of the present embodiment.

FIG. 1 is a diagram illustrating an example of a schematic configuration of an audio processing system 1 of the present embodiment.

The audio processing system 1 is a system for recognizing speech in a space. In the present embodiment, a case where the space is a space inside the cabin of a vehicle 2 will be described as an example. Additionally, in the present embodiment, a mode that the audio processing system 1 is mounted on the vehicle 2 will be described as an example. The space is not limited to the cabin of the vehicle 2.

The audio processing system 1 includes a microphone MC, a speaker SP, an audio processing apparatus 10, an audio source device 30, a speech recognition unit 40 (an example of the speech recognition device), an electronic device 50, and a display 60. The microphone MC, the speaker SP, the speech recognition unit 40, and the display 60 are communicably connected to the audio processing apparatus 10. The audio processing system 1 may be configured to include at least the microphone MC, the speaker SP, the audio processing apparatus 10, and the speech recognition unit 40.

The microphone MC collects sound in the space. In the present embodiment, the microphone MC collects sound at least in a space in the cabin of the vehicle 2. In the present embodiment, a mode in which the microphone MC is provided in the vicinity of the driver's seat that is a seat of a driver hm1 of the vehicle 2 (a right-hand drive car) will be described as an example. Therefore, in the present embodiment, the microphone MC collects sound including at least an audio component corresponding to speech uttered by the driver hm1.

The vehicle 2 may be provided with a plurality of microphones MC. In this case, those microphones MC are preferably disposed at different positions in the cabin of the vehicle 2. Specifically, for example, the microphones MC may be individually disposed in the vicinity of seats of the driver hm1, an occupant hm2, an occupant hm3, and an occupant hm4 of the vehicle 2. In the present embodiment, a mode in which one microphone MC is provided in the vehicle 2 will be described as an example.

The microphone MC may be a directional microphone or an omnidirectional microphone. The microphone MC may be a small micro electro mechanical systems (MEMS) microphone or an electret condenser microphone (ECM). The microphone MC may be a beamforming enabled microphone. In one example, the microphone MC is a microphone array that has directivity in a specific direction and can collect sound in the directivity direction.

The microphone MC outputs an audio signal of the collected sound to the audio processing apparatus 10. The audio processing apparatus 10 is provided to correlate with the microphone MC. Therefore, in a case where the audio processing system 1 includes a plurality of microphones MC, the audio processing system 1 may include a plurality of audio processing apparatuses 10 corresponding to the plurality of microphones MC. In the present embodiment, a mode in which the audio processing system 1 includes one microphone MC and one audio processing apparatus 10 communicably connected to the microphone MC will be described as an example.

The speaker SP outputs audio sound to a space that is the same as the space from which the microphone MC corrects sound. In the present embodiment, the speaker SP outputs audio sound at least to the space in the cabin of the vehicle 2.

In the present embodiment, four speakers SP, namely, speakers SP1 to SP4, are arranged in the cabin of the vehicle 2. Note that it is sufficient for the audio processing system 1 to have a configuration including at least one speaker SP. The number and arrangement positions of the speakers SP are not limited. In one example of the present embodiment, the speaker SP1, the speaker SP2, the speaker SP3, and the speaker SP4 are respectively arranged in the vicinity of seats of the driver hm1, the occupant hm2, the occupant hm3, and the occupant hm3 in the cabin of the vehicle 2. When the speakers SP1 to SP4 are collectively described, they are simply referred to as a speaker SP or speakers SP.

The speaker SP is electrically connected to the audio source device 30. The speaker SP outputs audio sound represented by the reproduction signal received from the audio source device 30. The reproduction signal is a signal output from the audio source device 30 to the speaker SP. The speaker SP outputs audio sound corresponding to the reproduction signal received from the audio source device 30. Specifically, the speaker SP outputs audio sound with volume corresponding to a level of the reproduction signal that has been received from the audio source device 30. In the present embodiment, the level refers to a level of a signal, and specifically means the loudness of audio sound represented by the signal.

The audio source device 30 is, for example, a radio receiver, a television broadcasting device, and/or an audio device. The radio receiver receives a radio broadcast signal, generates a reproduction signal from the received radio broadcast signal, and outputs the reproduction signal to the speaker SP. In this case, the reproduction signal is, for example, a radio audio signal of radio sound. The television broadcasting device receives a television broadcast signal, generates a reproduction signal from the received television broadcast signal, and outputs the reproduction signal to the speaker SP. In this case, the reproduction signal is, for example, a television audio signal of television sound. The audio device outputs a reproduction signal such as an audio signal recorded in a memory or the like to the speaker SP. In this case, the reproduction signal is, for example, an audio signal.

In the present embodiment, the audio source device 30 generates reproduction signals of four channels in order to use the four speakers SP (SP1 to SP4), and outputs the reproduction signals to the four speakers SP as reference signals. Specifically, the audio source device 30 outputs the reference signal 1 being a reproduction signal to the speaker SP1, outputs the reference signal 2 being a reproduction signal to the speaker SP2, outputs the reference signal 3 being a reproduction signal to the speaker SP3, and outputs the reference signal 4 being a reproduction signal to the speaker SP4. Thus, the reference signals 1 to 4 are reproduction signals output to the four speakers SP. When the reference signals 1 to 4 are collectively described, they are simply referred to as a reference signal or reference signals.

The audio processing apparatus 10 outputs, to the speech recognition unit 40, an output signal that is based on the audio signal received from the microphone MC and a reference signal being a reproduction signal reproduced from the speaker SP. Details of the audio processing apparatus 10 will be described later.

The speech recognition unit 40 recognizes speech represented by an output signal received from the audio processing apparatus 10 and outputs a signal representing a speech recognition result to the electronic device 50. In one example, the speech recognition unit 40 recognizes a speech command represented by the output signal and outputs the speech command to the electronic device 50. The speech command is a signal for instructing the electronic device 50 to execute various types of processing. The speech command may be referred to as a speech recognition command, a keyword, a wake-up word, or the like.

The electronic device 50 executes processing in accordance with the speech command that is a signal representing the speech recognition result received from the speech recognition unit 40. The electronic device 50 may execute processing of opening and closing a window, processing related to driving of the vehicle 2, processing of changing the temperature of the air conditioner, processing of changing the volume of the audio device, and the like in accordance with the speech command. The electronic device 50 is, for example, a car navigation device, an air conditioner, a panel meter, a television, a mobile terminal, a driving device that drives each unit of the vehicle 2, or the like.

The display 60 is a display device that displays various types of information. Examples of the display 60 include a head-up display, a display of a car navigation system, a multi-information display provided in a meter of the vehicle 2, a center display capable of receiving audio operation, etc., each being installed in the vehicle 2. In the present embodiment, information is displayed on the display 60 by the audio processing apparatus 10 described later. Note that the display 60 may function as an example of the electronic device 50.

The audio processing apparatus 10 will be described in detail. First, an example of a hardware configuration of the audio processing apparatus 10 will be described.

Figure 2:
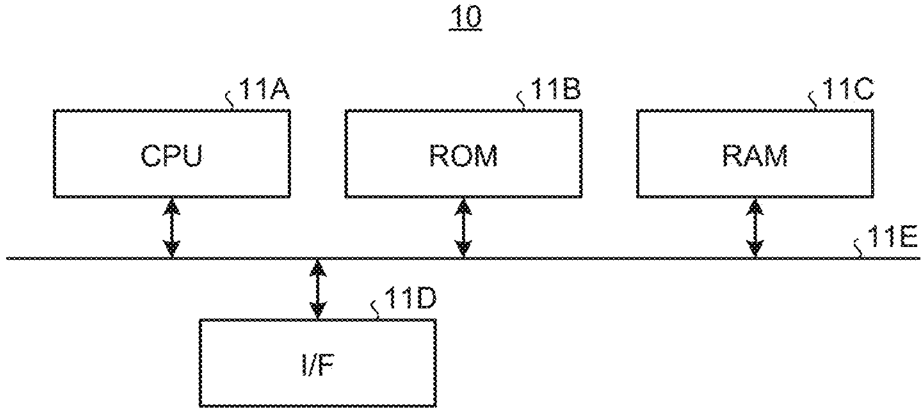
FIG. 2 is a hardware configuration diagram of an example of an audio processing apparatus.

FIG. 2 is a hardware configuration diagram of an example of the audio processing apparatus 10.

The audio processing apparatus 10 has a hardware configuration using a normal computer in which a central processing unit (CPU) 11A, a read only memory (ROM) 11B, a RAM 11C, an I/F 11D, and the like are connected to one another by a bus 11E.

The CPU 11A is an arithmetic device that controls the audio processing apparatus 10 of the present embodiment. The ROM 11B stores programs and the like for implementing various processing by the CPU 11A. The RAM 11C stores data necessary for various processing by the CPU 11A. The I/F 11D is an interface for transmitting and receiving data.

A computer program for executing information processing executed by the audio processing apparatus 10 of the present embodiment is provided by being incorporated in the ROM 11B or the like in advance. Note that the computer program executed by the audio processing apparatus 10 of the present embodiments may be configured to be provided by being recorded in a computer-readable recording medium such as a CD-ROM, a flexible disk (FD), a CD-R, or a digital versatile disk (DVD) as a file in a format installable or executable in the audio processing apparatus 10.

Next, the configuration of the audio processing apparatus 10 will be described in detail.

Figure 3:
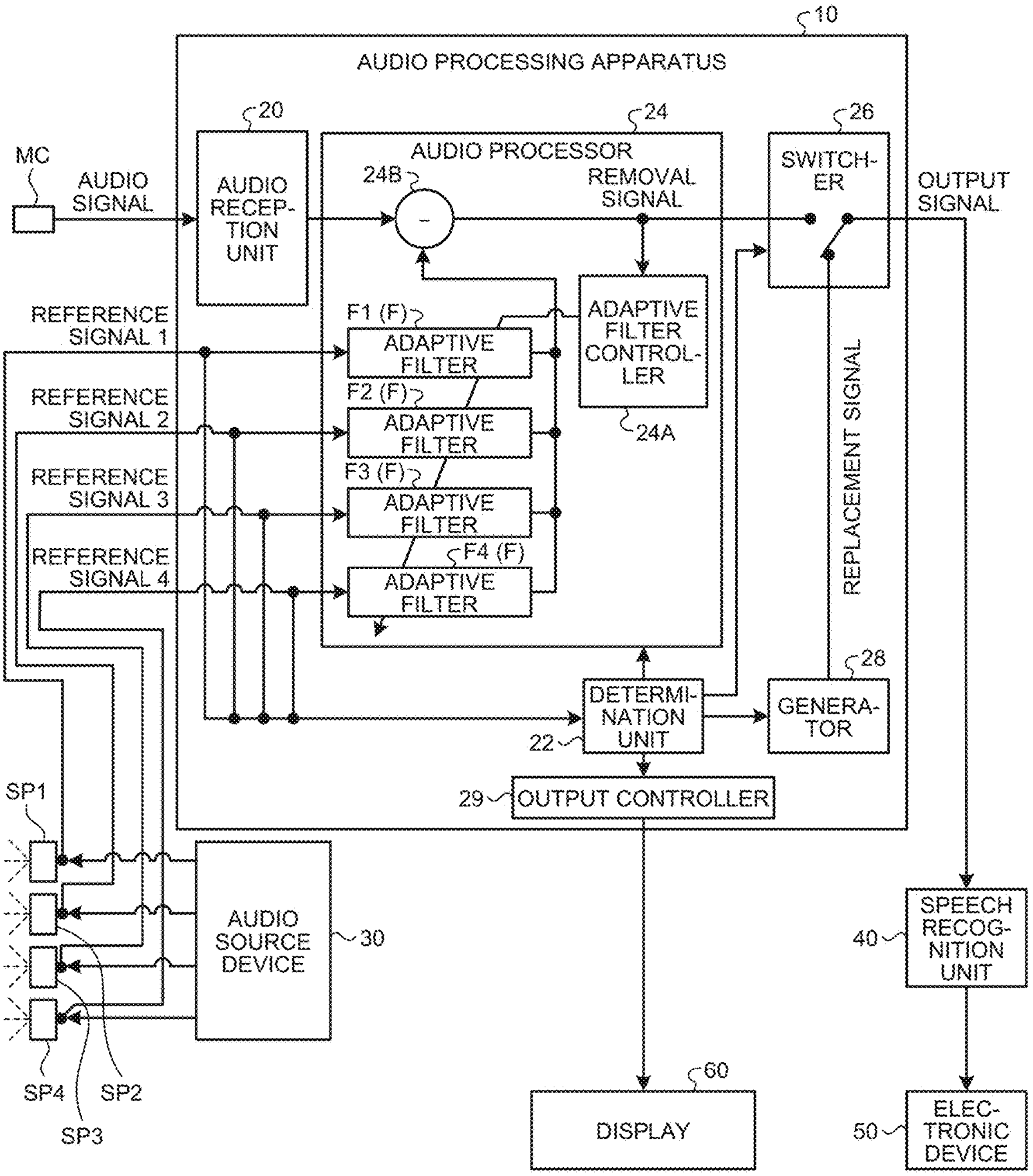
FIG. 3 is a block diagram illustrating an example of a configuration of the audio processing apparatus.

FIG. 3 is a block diagram illustrating an example of a configuration of the audio processing apparatus 10. For the sake of explanation, FIG. 3 illustrates the microphone MC, the audio source device 30, the speech recognition unit 40, the electronic device 50, and the display 60 in addition to the audio processing apparatus 10.

The audio processing apparatus 10 includes an audio reception unit 20, a determination unit 22, an audio processor 24, a switcher 26, a generator 28, and an output controller 29.

Part of or all the audio reception unit 20, the determination unit 22, the audio processor 24, the switcher 26, the generator 28, and the output controller 29 may be implemented by, for example, causing a processing device such as the CPU 11A to execute a computer program, namely, implemented by software. Alternatively, they may be implemented by hardware such as an integrated circuit (IC), or may be implemented by software and hardware in combination. Moreover, at least one of the audio reception unit 20, the determination unit 22, the audio processor 24, the switcher 26, the generator 28, and the output controller 29 may be provided in an external information processing apparatus communicably connected to the audio processing apparatus 10 via a network or the like.

The audio reception unit 20 receives an audio signal from the microphone MC. The audio reception unit 20 outputs the received audio signal to the audio processor 24.

The determination unit 22 determines whether or not the level of the reference signal, which is a reproduction signal reproduced from the speaker SP, is equal to or greater than a threshold. The level of the reference signal refers to loudness of the audio sound represented by the reproduction signal serving as the reference signal. As described above, the speaker SP outputs audio sound with volume corresponding to a level of the reproduction signal received from the audio source device 30. Therefore, the higher the level of the reference signal (i.e., reproduction signal), the higher the volume of the audio sound output from the speaker SP.

The threshold may be a value that is equal to or lower than the level of the reproduction signal when the level of the reproduction signal is gradually increased and distortion starts to occur in the audio sound output from the speaker SP in response to the reproduction signal and is close to the level. Additionally, the threshold may be a value that matches the level of the reproduction signal when the level of the reproduction signal is gradually increased and distortion starts to occur in the audio sound output from the speaker SP in response to the reproduction signal. The distortion of audio sound output from the speaker SP may be referred to as sound cracking.

In one example, the determination unit 22 determines a threshold that meets the above-described condition for each of the speakers SP1 to SP4.

The determination unit 22 then determines whether or not at least one of the levels of the reference signals 1 to 4 received from the speakers SP1 to SP4 is equal to or greater than the corresponding threshold.

The determination unit 22 may set the minimum value, the average value, or the maximum value of the thresholds of the speakers SP1 to SP4, which meet the above-described condition, as a threshold to be shared by the speakers SP1 to SP4. In this case, the determination unit 22 may determine whether or not at least one of the levels of the reference signals 1 to 4 received from the speakers SP1 to SP4 is equal to or greater than the shared threshold.

In the present embodiment, a mode will be described as an example in which the determination unit 22 determines whether or not at least one of the levels of the reference signals 1 to 4 received from the speakers SP1 to SP4 is equal to or greater than the corresponding threshold.

The thresholds corresponding to the speakers SP1 to SP4 may be stored in advance in a memory or the like of the determination unit 22. In addition, the thresholds corresponding to the speakers SP1 to SP4 may be appropriately changed within a range that meets the above-described condition by an operation instruction by the user according to the type, installation position, or the like of the speaker SP provided in the audio processing system 1.

The audio processor 24 generates a removal signal obtained by removing (or canceling) the audio component of the reference signal, from the audio signal received from the audio reception unit 20.

The audio processor 24 removes an audio component of a reference signal (i.e., reproduction signal) included in the audio signal received from the audio reception unit 20. The audio processor 24 may remove the audio component of the reference signal included in the audio signal by using a known echo canceller or a known crosstalk canceller.

For example, the audio processor 24 includes an adaptive filter F, an adaptive filter controller 24A, and a subtraction unit 24B.

The adaptive filter F is a filter having a function to change properties of the reference signal. In the present embodiment, the adaptive filter F includes the adaptive filters F1 to F4. The number of the adaptive filters F may be appropriately set based on the number of input reference signals.

The adaptive filter controller 24A sets the filter coefficient of each of the adaptive filters F1 to F4 by a known method in response to the removal signal output from the subtraction unit 24B. Each of the adaptive filters F1 to F4 outputs, as a subtraction signal to the subtraction unit 24B, a pass signal that is based on a corresponding one of the received reference signals 1 to 4 and the corresponding filter coefficient. Therefore, the subtraction unit 24B receives a subtraction signal obtained by adding up the pass signals output from the adaptive filters F1 to F4, which are based on the reference signals 1 to 4 and the filter coefficients of these filters F1 to F4.

The subtraction unit 24B performs removal processing of removing the audio component of the reference signal from the audio signal by subtracting the subtraction signal from the audio signal received from the audio reception unit 20. The subtraction unit 24B outputs, to the adaptive filter controller 24A and the switcher 26, a removal signal obtained by the removal processing, namely, obtained by removing the audio component of the reference signal from the audio signal.

In a case where the level of the reference signal is determined to be equal to or greater than a threshold, the switcher 26 operates to output a replacement signal that is at least one of comfort noise and a mute signal to the speech recognition unit 40 as an output signal, instead of outputting the removal signal received from the audio processor 24.

Specifically, when the determination unit 22 determines that the level of the reference signal is equal to or greater than a threshold, the switcher 26 performs switching such that, in place of the removal signal received from the audio processor 24, the replacement signal received from the generator 28 is output to the speech recognition unit 40.

The generator 28 generates a replacement signal that is at least one of comfort noise and a mute signal, and outputs the replacement signal to the switcher 26. The mute signal is a signal whose sound level is "0". In other words, the mute signal is a signal representing a silent state, a silenced state, or no signal (MUTE).

In a case of generating the comfort noise as the replacement signal, it is preferable that the generator 28 generates the comfort noise at a level corresponding to the noise level included in an audio signal that is received at the timing immediately before the determination unit 22 determines that the comfort noise is equal to or greater than the threshold. Specifically, for example, the audio reception unit 20 outputs an audio signal received from the microphone MC to the audio processor 24 and the generator 28. The generator 28 determines a noise level included in the audio signal received from the audio reception unit 20 at the timing immediately before the determination unit 22 determines that the noise level in the audio signal is equal to or greater than the threshold by a known method. Then, the generator 28 generates comfort noise at a level corresponding to the determined noise level. In one example, the generator 28 generates comfort noise with volume at the same level as the determined noise level.

Since the generator 28 generates the comfort noise as the replacement signal at the level corresponding to the noise level included in the audio signal at the timing immediately before the determination that the noise level is equal to or greater than the threshold, the level of the output signal output to the speech recognition unit 40 can be suppressed from suddenly changing. Specifically, for example, when the sound environment of the space changes with a change in the traveling environment of the vehicle 2, comfort noise at a level corresponding to the change in the sound environment of the space is output to the speech recognition unit 40 as the replacement signal. Therefore, when the output signal output to the speech recognition unit 40 is switched from the replacement signal to the removal signal or from the removal signal to the replacement signal, the sudden change in the level of the output signal is suppressed. As a result, it is possible to suppress decrease in performance of the speech recognition unit 40 due to the sudden change in the level of the output signal.

Moreover, the generator 28 may generate a replacement signal including both the comfort noise and the mute signal, and output the replacement signal to the switcher 26. In one example, the generator 28 generates a replacement signal in which comfort noise and a mute signal are alternately arranged. In this case, it is preferable that generator 28 generates an output signal whose level is adjusted to gradually change at the time of switching between the comfort noise and the mute signal.

Although the generator 28 may constantly generate the replacement signal, it is preferable to generate the replacement signal and output the replacement signal to the switcher 26 when the determination unit 22 determines that the level of the reference signal is equal to or greater than a threshold. Then, when the determination unit 22 determines that the level of the reference signal is less than the threshold, the generator 28 may stop the generation processing of the replacement signal.

When the determination unit 22 determines that the level of the reference signal is less than the threshold, the generator 28 stops the generation processing of the replacement signal. Thereby, the processing operation amount of the audio processing apparatus 10 can be reduced.

In response to determining by the determination unit 22 that the level of the reference signal is equal to or greater than a threshold, the switcher 26 operates to output the replacement signal received from the generator 28 as an output signal to the speech recognition unit 40, instead of outputting the removal signal received from the audio processor 24. Therefore, when the determination unit 22 determines that the level of the reference signal is equal to or greater than the threshold, a replacement signal is output to the speech recognition unit 40 in place of the removal signal.

Note that, in a period of time during which the determination unit 22 determines that the level of the reference signal is equal to or greater than a threshold, the switcher 26 may operate to output the replacement signal in place of the removal signal to the speech recognition unit 40 as an output signal. Additionally, in a period of time during which the determination unit 22 determines that the level of the reference signal is less than the threshold, the switcher 26 may operate to output the removal signal received from the audio processor 24 to the speech recognition unit 40 as an output signal.

With the above-described operation, the replacement signal is output to the speech recognition unit 40 as an output signal in a period of time during which the level of the reference signal is equal to or greater than the threshold. In a period of time during which the level of the reference signal is less than the threshold, the removal signal is output to the speech recognition unit 40 as an output signal.

Moreover, in response to determining that the level of the reference signal is equal to or greater than a threshold, the switcher 26 may operate to continuously output, for a predetermined first period of time, the replacement signal in place of the removal signal to the speech recognition unit 40 as an output signal.

The first period of time may be set in advance. In one example, the first period of time may be defined to be longer than the continuous output time of the replacement signal to the speech recognition unit 40 at a time when the performance deterioration of the speech recognition unit 40 occurs due to the output signal output to the speech recognition unit 40 being repeatedly switched to the removal signal and the replacement signal in a short time. In one example, the first period of time may be set to a value that is equal to or longer than the average utterance period required for utterance of one speech command and shorter than the average utterance period when two speech commands are uttered continuously. Additionally, the first period of time may be appropriately changeable in accordance with an operation instruction or the like by the user.

In such cases, the replacement signal is output as an output signal to the speech recognition unit 40 continuously for at least the first period of time from the timing at which the level of the reference signal becomes equal to or greater than the threshold. Then, after the first period of time has elapsed, the removal signal is output as an output signal to the speech recognition unit 40.

In a case where the determination unit 22 continuously determines that the level of the reference signal is equal to or greater than the threshold during a predetermined second period of time or more, the switcher 26 may operate to output the replacement signal in place of the removal signal to the speech recognition unit 40.

The second period of time may be set in advance. In one example, the second period of time may be defined to be longer than the continuous output time of the removal signal or the replacement signal to the speech recognition unit 40 at a time when the performance deterioration of the speech recognition unit 40 occurs due to the output signal output to the speech recognition unit 40 being repeatedly switched to the removal signal and the replacement signal in a short time. In one example, the second period of time may be set to a value that is equal to or longer than the average utterance period required for utterance of one speech command and shorter than the average utterance period when two speech commands are uttered continuously. In one example, the second period of time may be appropriately changeable in accordance with an operation instruction or the like by the user.

In such cases, the replacement signal is output as the output signal to the speech recognition unit 40 in a case where the state that the level of the reference signal is equal to or greater than the threshold continues for the second period of time. Then, when the duration of the state in which the level of the reference signal is less than the threshold or the level is equal to or greater than the threshold is less than the second period of time, the removal signal is output to the speech recognition unit 40 as an output signal.

Note that the audio processor 24 may constantly perform the removal processing of removing the audio component of the reference signal from the audio signal, but may stop the removal processing in a case where the determination unit 22 determines that the level of the reference signal is equal to or greater than a threshold. Specifically, in response to determining that the level of the reference signal is equal to or greater than a threshold, the determination unit 22 controls the audio processor 24 to stop the removal processing.

When the level of the reference signal is determined to be equal to or greater than a threshold, the audio processor 24 stops the removal processing, so that the processing operation amount of the audio processing apparatus 10 can be reduced.

In response to determining that the level of the reference signal is equal to or greater than a threshold, the output controller 29 outputs information representing that speech recognition is being stopped. In one example, the output controller 29 outputs, to the display 60, information representing that speech recognition is being stopped.

As described above, when the level of the reference signal is equal to or greater than a threshold, the replacement signal is output to the speech recognition unit 40 as an output signal. Since the replacement signal is at least one of comfort noise and a mute signal, the speech recognition unit 40 does not perform speech recognition for a period of time during which the replacement signal is received. Therefore, in a situation where the speaker SP outputs audio sound with a volume corresponding to the reproduction signal at a level equal to or greater than a threshold in the space inside the cabin of the vehicle 2, even when the driver hm1 or the like utters a speech command or the like, speech recognition by the speech recognition unit 40 is not performed. Therefore, with the configuration that the output controller 29 outputs the information representing that speech recognition is being stopped in response to determining that the level of the reference signal (i.e., reproduction signal) is equal to or greater than a threshold, the situation of speech recognition of the speech recognition unit 40 can be clearly presented to the user.

Note that the output target of the information from the output controller 29 is not limited to the display 60. In one example, the output controller 29 may transmit information representing that speech recognition is being stopped to an information processing apparatus such as a mobile terminal of the driver hm1 registered in advance. In one example, the output controller 29 may output, from the speaker SP, information representing that speech recognition is being stopped. In this case, the level of the reproduction signal of the information to be output from the speaker SP may be set to a level less than the above-described threshold.

Next, an example of a procedure of information processing executed by the audio processing apparatus 10 of the present embodiment will be described.

Figure 4:
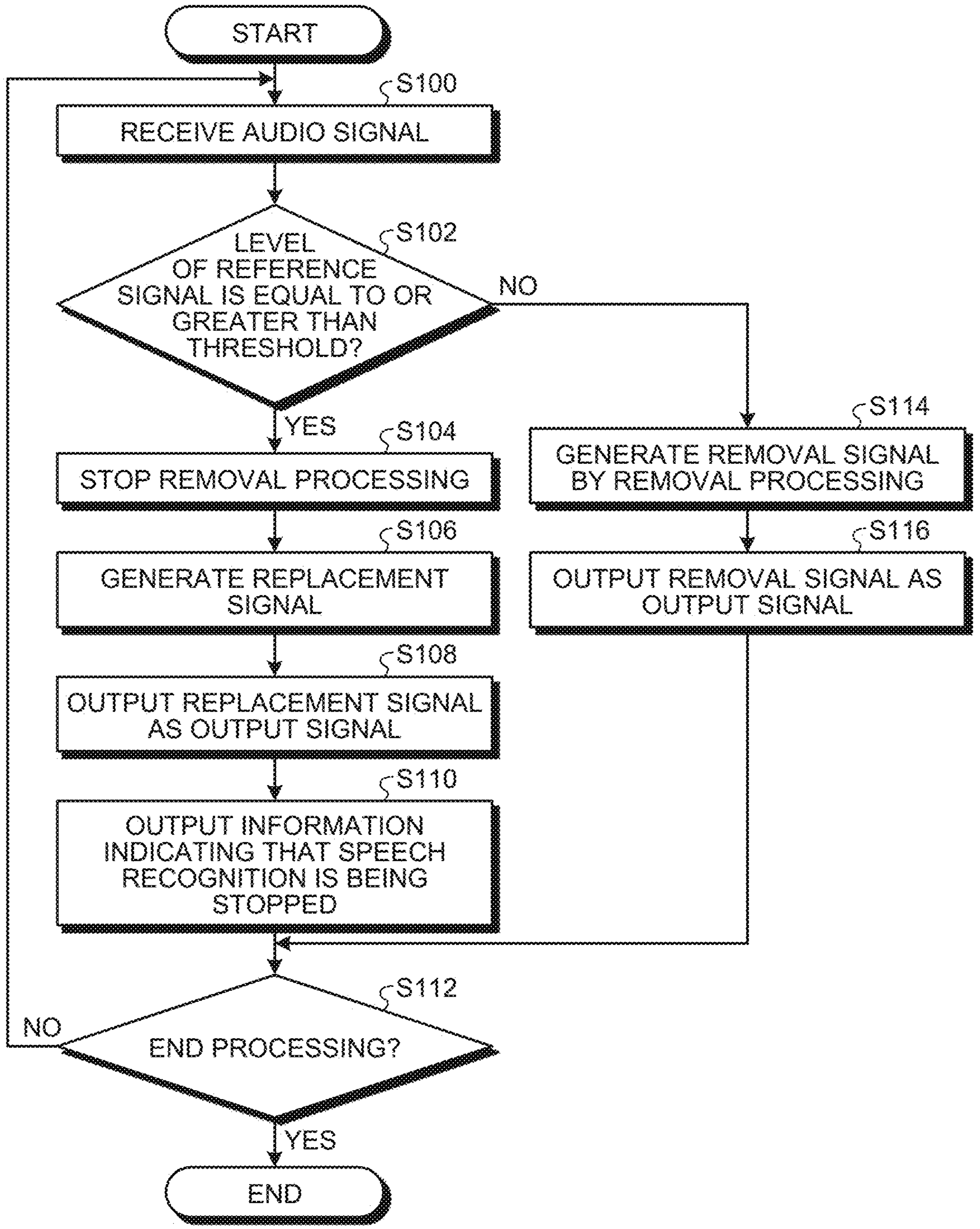
FIG. 4 is a flowchart illustrating an example of a procedure of information processing executed by the audio processing apparatus of the present embodiment.

FIG. 4 is a flowchart illustrating an example of a procedure of information processing executed by the audio processing apparatus 10 of the present embodiment.

The audio reception unit 20 receives an audio signal from the microphone MC (Step S100).

The determination unit 22 determines whether or not the level of the reference signal, which is a reproduction signal reproduced from the speaker SP, is equal to or greater than a threshold (Step S102). In response to determining that the level of the reference signal is equal to or greater than the threshold (Step S102: Yes), the process proceeds to Step S104.

In Step S104, the determination unit 22 controls the audio processor 24 to stop the removal processing. The audio processor 24 stops the removal processing in accordance with the control in Step S104.

The generator 28 generates a replacement signal that is at least one of comfort noise and a mute signal, and outputs the replacement signal to the switcher 26 (Step S106).

The switcher 26 operates to output the replacement signal generated by the generator 28 to the speech recognition unit 40 as an output signal (Step S108). The replacement signal is at least one of comfort noise and a mute signal, so that the replacement signal does not include a speech command. Therefore, in a period of time during which the replacement signal is received, the speech recognition unit 40 is in a state of not recognizing the speech command.

The output controller 29 outputs, to the display 60, information representing that speech recognition is being stopped (Step S110).

The audio processing apparatus 10 determines whether or not to end the processing (Step S112). In one example, the audio processing apparatus 10 performs the determination of Step S112 by determining whether or not interruption of the power supply to the audio processing apparatus 10 is instructed by an operation instruction or the like by the user. When an affirmative determination is made in Step S112 (Step S112: Yes), the audio processing apparatus 10 ends this routine. When the audio processing apparatus 10 makes a negative determination in Step S112 (Step S112: No), the processing returns to Step S100 described above.

On the other hand, in response to determining in Step S102 that the level of the reference signal, which is the reproduction signal reproduced from the speaker SP, is less than the threshold (Step S102: No), the processing proceeds to Step S114.

In Step S114, the audio processor 24 executes the removal processing and thereby generates a removal signal obtained by removing the audio component of the reference signal from the audio signal received from the audio reception unit 20. Note that, in a case where the removal processing by the audio processor 24 is stopped by the processing in Step S104 described above, the audio processor 24 may execute the removal processing in Step S114 after the determination unit 22 controls the audio processor 24 to cancel the stoppage of the removal processing.

The switcher 26 operates to output the removal signal generated by the audio processor 24 to the speech recognition unit 40 as an output signal (Step S116). The removal signal is obtained by removing the reproduction signal being the reference signal from the audio signal, so that the removal signal may include a speech command. Therefore, in a period of time during which the removal signal is received as the output signal, the speech recognition unit 40 is in a state that recognition of the speech command is enabled. Then, the processing proceeds to Step S112 described above.

As described above, the audio processing apparatus 10 according to the present embodiment includes the audio reception unit 20, the determination unit 22, the audio processor 24, and the switcher 26. The audio reception unit 20 receives an audio signal from the microphone MC serving to collect sound in a space. The determination unit 22 determines whether or not a level of the reference signal, which is a reproduction signal reproduced from the speaker SP, is equal to or greater than a threshold. The audio processor 24 outputs, as an output signal to the speech recognition unit 40, a removal signal that is obtained by removing the audio component of the reference signal from the audio signal. In response to determining that the level of the reference signal is equal to or greater than the threshold, the switcher 26 operates to output, as an output signal to the speech recognition unit 40, a replacement signal that is at least one of comfort noise and a mute signal, instead of outputting the removal signal.

Meanwhile, the conventional technique discloses a configuration that a first speech recognition unit recognizes speech in sound collected by a microphone, a second speech recognition unit recognizes speech in audio sound output from a speaker. In this configuration, when the speech recognized by the second speech recognition unit includes a speech recognition command, the first speech recognition unit stops the recognition. However, in such a conventional technique, when the sound collected by the microphone includes a noise component such as a residual echo component that cannot be removed by an echo canceller, misrecognition of speech may occur. In the conventional technique, there is a case where it is difficult to suppress misrecognition of speech. Moreover, in the conventional technique, there is a case where misrecognition of speech occurs in speech recognition by the first speech recognition unit depending on performance or the like of the second speech recognition unit.

On the other hand, according to the audio processing apparatus 10 of the present embodiment, in response to determining that the level of the reference signal, which is the reproduction signal, is equal to or greater than the threshold, a replacement signal being at least one of comfort noise and a mute signal is output to the speech recognition unit 40 as an output signal, instead of outputting the removal signal obtained by removing the audio component of the reference signal from the audio signal received from the microphone MC. The replacement signal is at least one of comfort noise and a mute signal, so that the replacement signal does not include a speech command. Therefore, in a period of time during which the replacement signal is received, the speech recognition unit 40 is in a state of not recognizing the speech command.

Therefore, in the audio processing apparatus 10 of the present embodiment, even in a sound environment where the level of the reproduction signal reproduced from the speaker SP is large and a component that cannot be canceled by the removal processing remains in the audio signal collected by the microphone MC, it is possible to suppress misrecognition of speech due to the reproduction signal.

As a result, the audio processing apparatus 10 of the present embodiment can suppress misrecognition of speech.

In addition, in the audio processing apparatus 10 of the present embodiment, the determination unit 22 determines whether or not the level of the reproduction signal reproduced from the speaker SP is equal to or greater than the threshold. The target to be determined is not the level of the audio signal received from the microphone MC. Therefore, regardless of the magnitude of the level of speech uttered by the user, when the level of the reproduction signal is less than the threshold, the removal signal including the audio component of the user collected by the microphone MC can be output to the speech recognition unit 40 as the speech recognition target. Therefore, in addition to the above effects, the audio processing apparatus 10 of the present embodiment can effectively perform speech recognition on an audio signal including a speech command or the like uttered by the user.

In addition, in the audio processing system 1 of the present embodiment, the speech recognition unit 40 does not perform the speech recognition on the reproduction signal of the speaker SP. Therefore, it is possible to reduce the processing operation amount of the audio processing system 1 in addition to the above-described effect. Moreover, in the present embodiment, since speech recognition is not performed on the reproduction signal, it is possible to suppress misrecognition of speech regardless of the speech recognition accuracy of the speech recognition unit 40.

Note that, in the present embodiment, a mode in which the audio processing system 1 is mounted on the vehicle 2 has been described as an example. However, the audio processing system 1 may be configured to be arranged in any space as an audio processing target, and is not limited to the configuration that the system 1 is installed in the vehicle 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio processing apparatus comprising:

a memory in which a computer program is stored; and a hardware processor coupled to the memory and configured to perform processing by executing the computer program, the processing including:

receiving an audio signal from a microphone serving to collect sound in a space;

determining whether a level of a reference signal is equal to or greater than a threshold, the reference signal being a reproduction signal reproduced by a speaker serving to output audio sound to the space;

outputting, as an output signal to a speech recognition device, a removal signal obtained by removing an audio component of the reference signal from the audio signal, and;

outputting, as an output signal to the speech recognition device, a replacement signal in place of the removal signal in response to determining that the level of the reference signal is equal to or greater than the threshold, the replacement signal being at least one of comfort noise and a mute signal; and outputting, to a display, information representing that speech recognition is being stopped, the information being output in response to determining that the level of the reference signal is equal to or greater than the threshold.

2. The audio processing apparatus according to claim 1, wherein the hardware processor is configured to stop removal processing of removing an audio component of the reference signal from the audio signal, the removal processing being stopped in response to determining that the level of the reference signal is equal to or greater than the threshold.

3. The audio processing apparatus according to claim 1, wherein the hardware processor is configured to generate, as the replacement signal, comfort noise corresponding to a noise level included in the audio signal immediately before determining that the level of the reference signal is equal to or greater than the threshold.

4. The audio processing apparatus according to claim 1, wherein the hardware processor is configured to output the replacement signal in place of the removal signal to the speech recognition device as the output signal, the replacement signal being output for a period of time during which the level of the reference signal is determined to be equal to or greater than the threshold.

5. The audio processing apparatus according to claim 1, wherein the hardware processor is configured to output the replacement signal in place of the removal signal to the speech recognition device as the output signal continuously for a predetermined first period of time, the replacement signal being output in response to determining that the level of the reference signal is equal to or greater than the threshold.

6. The audio processing apparatus according to claim 1, wherein the hardware processor is configured to output the replacement signal in place of the removal signal to the speech recognition device as the output signal, the replacement signal being output in a case where the level of the reference signal is continuously determined to be equal to or greater than the threshold during a predetermined second period of time or more.

7. An audio processing method implemented by a computer, the method comprising:

receiving an audio signal from a microphone serving to collect sound in a space;

determining whether a level of a reference signal is equal to or greater than a threshold, the reference signal being a reproduction signal reproduced by a speaker serving to output audio sound to the space;

outputting, as an output signal to a speech recognition device, a removal signal obtained by removing an audio component of the reference signal from the audio signal;

outputting, as an output signal to the speech recognition device, a replacement signal in place of the removal signal in response to determining that the level of the reference signal is equal to or greater than the threshold, the replacement signal being at least one of comfort noise and a mute signal; and outputting, to a display, information representing that speech recognition is being stopped, the information being output in response to determining that the level of the reference signal is equal to or greater than the threshold.

8. The audio processing method according to claim 7, further comprising stopping removal processing of removing an audio component of the reference signal from the audio signal, the removal processing being stopped in response to determining that the level of the reference signal is equal to or greater than the threshold.

9. The audio processing method according to claim 7, further comprising generating, as the replacement signal, comfort noise corresponding to a noise level included in the audio signal immediately before determining that the level of the reference signal is equal to or greater than the threshold.

10. The audio processing method according to claim 7, wherein the outputting of the replacement signal is performed for a period of time during which the level of the reference signal is determined to be equal to or greater than the threshold.

11. The audio processing method according to claim 7, wherein the outputting of the replacement signal is performed continuously for a predetermined first period of time.

12. The audio processing method according to claim 7, wherein the outputting of the replacement signal is performed in a case where the level of the reference signal is continuously determined to be equal to or greater than the threshold during a predetermined second period of time or more.

13. A non-transitory computer-readable recording medium on which programmed instructions are recorded, the programmed instructions causing a computer to execute processing, the processing comprising:

receiving an audio signal from a microphone serving to collect sound in a space, determining whether a level of a reference signal is equal to or greater than a threshold, the reference signal being a reproduction signal reproduced by a speaker serving to output audio sound to the space, outputting, as an output signal to a speech recognition device, a removal signal obtained by removing an audio component of the reference signal from the audio signal, and outputting, as an output signal to the speech recognition device, a replacement signal in place of the removal signal in response to determining that the level of the reference signal is equal to or greater than the threshold, the replacement signal being at least one of comfort noise and a mute signal, wherein the threshold is a value that matches a level of the reproduction signal at which distortion starts to occur in an audio sound output from the speaker in response to the level of the reproduction signal being gradually increased.

14. The audio processing apparatus according to claim 1, wherein the hardware processor is configured to determine whether the level of the reference signal is equal to or greater than the threshold independently of the audio signal from the microphone.

15. The audio processing method according to claim 7, wherein the determining includes determining whether the level of the reference signal is equal to or greater than the threshold independently of the audio signal from the microphone.

* * * * *